(12) United States Patent
Hensley et al.

(10) Patent No.: US 10,327,506 B2
(45) Date of Patent: Jun. 25, 2019

(54) ARTICLE WITH OVERLAY SECURED TO BLADDER ELEMENT OVER IMAGE AND METHOD OF MANUFACTURING THE ARTICLE

(71) Applicant: NIKE, Inc., Beaverton, OR (US)

(72) Inventors: Taryn Hensley, Beaverton, OR (US); Dervin A. James, Hillsboro, OR (US)

(73) Assignee: NIKE, Inc., Beaverton, OR (US)

( * ) Notice: Subject to any disclaimer, the term of this patent is extended or adjusted under 35 U.S.C. 154(b) by 384 days.

(21) Appl. No.: 15/093,077

(22) Filed: Apr. 7, 2016

(65) Prior Publication Data

US 2016/0295964 A1    Oct. 13, 2016

Related U.S. Application Data

(60) Provisional application No. 62/144,554, filed on Apr. 8, 2015.

(51) Int. Cl.
  *A43B 13/20* (2006.01)
  *A43B 1/00* (2006.01)
  (Continued)

(52) U.S. Cl.
  CPC ............ *A43B 13/20* (2013.01); *A43B 1/0072* (2013.01); *A43B 3/0078* (2013.01); *A43B 13/12* (2013.01);
  (Continued)

(58) Field of Classification Search
  CPC ..... A43B 1/0072; A43B 3/0078; A43B 13/12; A43B 13/20; A43B 13/203; A43B 23/24;
  (Continued)

(56) References Cited

U.S. PATENT DOCUMENTS 2,151,314 A   3/1939   Burger
3,591,402 A   7/1971   Blackfan
(Continued)

FOREIGN PATENT DOCUMENTS

CA      1111222 A    10/1981
DE       243211 A1    2/1987
(Continued)

OTHER PUBLICATIONS

Nike Air Max 2015, Nov. 19, 2014; https://web.archive.org/web/20141119223217/http://news.nike.com/news/nike-air-max-2015-soft-cushioning-dynamic-fit-and-bold-design [retrieved on Jul. 20, 2016].
(Continued)

*Primary Examiner* — Richale L Quinn
*Assistant Examiner* — Anne M Kozak
(74) *Attorney, Agent, or Firm* — Quinn IP Law

(57) ABSTRACT

A method of manufacturing an article includes forming a fluid-filled bladder element from polymeric material. The method further includes securing an overlay to the polymeric material. At least one portion of the overlay is substantially transparent, and an image on one of the fluid-filled bladder element and the overlay is aligned with and exposed to view through the at least one portion of the overlay that is substantially transparent. The fluid-filled bladder element is assembled in the article so that a first portion of the fluid-filled bladder element and the image are exposed to view, and a second portion of the fluid-filled bladder element is blocked from view by the article. An article includes the fluid-filled bladder element with the image, and with the overlay secured to the fluid-filled bladder element.

25 Claims, 10 Drawing Sheets

(51) Int. Cl.
  *A43B 13/12* (2006.01)
  *A43B 3/00* (2006.01)
  *A43B 23/24* (2006.01)
  *B29D 35/12* (2010.01)
  *B29D 35/14* (2010.01)
  *G09F 23/00* (2006.01)

(52) U.S. Cl.
  CPC ............ *A43B 13/203* (2013.01); *A43B 23/24* (2013.01); *B29D 35/122* (2013.01); *B29D 35/128* (2013.01); *B29D 35/148* (2013.01); *G09F 23/00* (2013.01)

(58) Field of Classification Search
  CPC ... B29D 35/122; B29D 35/128; B29D 35/148
  See application file for complete search history.

(56) References Cited

U.S. PATENT DOCUMENTS

| | | | |
|---|---|---|---|
| 4,183,156 A | 1/1980 | Rudy | |
| 4,219,945 A | 9/1980 | Rudy | |
| 4,571,853 A * | 2/1986 | Medrano | A43B 17/08 36/29 |
| 4,936,029 A | 6/1990 | Rudy | |
| 5,042,176 A | 8/1991 | Rudy | |
| 5,393,372 A | 2/1995 | Ammon | |
| 5,572,804 A | 11/1996 | Skaja et al. | |
| 5,580,410 A | 12/1996 | Johnston | |
| 5,713,141 A | 2/1998 | Mitchell et al. | |
| 5,735,776 A | 4/1998 | Swezey et al. | |
| 5,802,739 A | 9/1998 | Potter et al. | |
| 5,815,950 A | 10/1998 | Wang | |
| 5,885,515 A | 3/1999 | Hudkins | |
| 5,952,065 A | 9/1999 | Mitchell et al. | |
| 5,968,657 A | 10/1999 | Scullin et al. | |
| 6,009,637 A | 1/2000 | Pavone | |
| 6,013,340 A | 1/2000 | Bonk et al. | |
| 6,031,019 A | 2/2000 | Tsutsumi et al. | |
| 6,060,144 A | 5/2000 | Kimura et al. | |
| 6,082,025 A | 7/2000 | Bonk et al. | |
| 6,099,789 A | 8/2000 | Sumi | |
| 6,127,026 A | 10/2000 | Bonk et al. | |
| 6,129,799 A * | 10/2000 | McGraw | B29C 65/02 156/146 |
| 6,164,729 A | 12/2000 | Dibenedetto et al. | |
| 6,203,868 B1 | 3/2001 | Bonk et al. | |
| 6,299,962 B1 | 10/2001 | Davis et al. | |
| 6,321,465 B1 | 11/2001 | Bonk et al. | |
| 6,361,840 B2 | 3/2002 | Milovich et al. | |
| 6,402,879 B1 | 6/2002 | Tawney et al. | |
| 6,451,417 B1 | 9/2002 | Kukumoto et al. | |
| 6,544,634 B1 | 4/2003 | Abrams et al. | |
| 6,547,703 B1 | 4/2003 | Swezey et al. | |
| 6,571,490 B2 | 6/2003 | Tawney et al. | |
| 6,632,858 B1 | 10/2003 | Pears et al. | |
| 6,790,391 B2 * | 9/2004 | Watkins | A43B 13/189 264/280 |
| 6,944,973 B2 | 9/2005 | Goodwin | |
| 6,998,005 B2 | 2/2006 | Magee et al. | |
| 7,073,276 B2 | 7/2006 | Swigart | |
| 7,131,218 B2 | 11/2006 | Schindler | |
| 7,152,343 B2 | 12/2006 | Whatley | |
| 7,178,267 B2 | 2/2007 | Skaja et al. | |
| 7,401,369 B2 | 7/2008 | White et al. | |
| 7,449,087 B2 | 11/2008 | Kanehara et al. | |
| 7,622,014 B2 | 6/2009 | Millette et al. | |
| 7,622,066 B2 | 11/2009 | Brustad et al. | |
| 7,917,981 B1 * | 4/2011 | Lakic | A43B 17/035 12/142 R |
| 8,574,387 B2 | 11/2013 | Hull et al. | |
| 8,813,389 B2 * | 8/2014 | Gishifu | A43B 13/203 36/29 |
| 8,850,719 B2 | 10/2014 | Hawkinson et al. | |
| 9,198,477 B2 | 12/2015 | Davis et al. | |
| 2003/0151168 A1 | 8/2003 | Gohl et al. | |
| 2004/0071936 A1 | 4/2004 | Martelli | |
| 2005/0023185 A1 | 2/2005 | Ramet | |
| 2006/0017200 A1 | 1/2006 | Brustad et al. | |
| 2007/0000605 A1 | 1/2007 | Millette et al. | |
| 2007/0294832 A1 * | 12/2007 | Shiao | A43B 13/20 5/654 |
| 2008/0110047 A1 | 5/2008 | White et al. | |
| 2008/0261016 A1 | 10/2008 | Onodera et al. | |
| 2009/0013557 A1 * | 1/2009 | Rudy | A43B 13/206 36/29 |
| 2009/0045542 A1 | 2/2009 | Borchert et al. | |
| 2011/0271552 A1 | 11/2011 | Peyton | |
| 2011/0277352 A1 | 11/2011 | Diepenbrock et al. | |
| 2012/0055044 A1 | 3/2012 | Dojan et al. | |
| 2012/0084999 A1 * | 4/2012 | Davis | A43B 23/029 36/93 |
| 2013/0055595 A1 | 3/2013 | Brown | |
| 2013/0068378 A1 | 3/2013 | Dua et al. | |
| 2013/0191969 A1 | 8/2013 | Goloveyko | |
| 2014/0202033 A1 | 7/2014 | Connell et al. | |
| 2014/0259749 A1 * | 9/2014 | Taylor | B29D 35/122 36/29 |
| 2015/0351499 A1 | 12/2015 | James | |
| 2016/0295963 A1 * | 10/2016 | Chang | A43B 13/12 |
| 2016/0295965 A1 * | 10/2016 | Hensley | A43B 13/12 |
| 2016/0295966 A1 | 10/2016 | Hensley et al. | |

FOREIGN PATENT DOCUMENTS

| | | |
|---|---|---|
| DE | 4038077 A | 6/1992 |
| GB | 1215135 A | 12/1970 |
| GB | 1265142 A | 3/1972 |
| GB | 1308776 A | 3/1973 |
| GB | 2330551 A | 4/1999 |
| GB | 2381492 A | 5/2003 |
| JP | 57174215 A2 | 10/1982 |
| JP | S57174215 A | 10/1982 |
| JP | 57178724 A | 11/1982 |
| JP | S57178724 A | 11/1982 |
| JP | S57185120 A2 | 11/1982 |
| JP | S6116830 A | 1/1986 |
| JP | S61146508 A | 7/1986 |
| JP | S6232023 A | 2/1987 |
| JP | S62280022 A | 12/1987 |
| JP | S631521 A | 1/1988 |
| JP | S6354230 A | 3/1988 |
| JP | S63212528 A | 4/1988 |
| JP | 63249615 A | 10/1988 |
| JP | 63252718 A | 10/1988 |
| JP | 1034719 A | 2/1989 |
| JP | S6434719 A | 2/1989 |
| JP | 0218025 A2 | 1/1990 |
| JP | 0218026 A2 | 1/1990 |
| JP | H0263717 A2 | 3/1990 |
| JP | H04187418 A2 | 7/1992 |
| JP | H04331127 A2 | 11/1992 |
| JP | 2008109501 A | 2/1993 |
| JP | H08294957 A2 | 11/1996 |
| JP | H08323849 A2 | 12/1996 |
| JP | H0911324 A2 | 1/1997 |
| JP | H0939078 A2 | 2/1997 |
| JP | H0948063 A2 | 2/1997 |
| JP | H0957826 A | 3/1997 |
| JP | 10156927 A | 6/1998 |
| JP | 10217320 A | 8/1998 |
| JP | 2003145612 A | 5/2003 |
| JP | 2004009304 A | 1/2004 |
| JP | 2004291647 A | 10/2004 |
| JP | 2005103965 A | 4/2005 |
| JP | 2005280250 A | 10/2005 |
| JP | 2006015760 A | 1/2006 |

(56) References Cited

FOREIGN PATENT DOCUMENTS

RU           2004447 C1    12/1993
WO      2010039826 A2     4/2010

OTHER PUBLICATIONS

American Society for Testing and Materials (ASTM) Standard D1003-00, Standard Test Method for Haze and Luminous Transmittance of Transparent Plastics, Jul. 2000, Book of Standards vol. 08.01, ASTM International, Pennsylvania, USA.

* cited by examiner

ARTICLE WITH OVERLAY SECURED TO BLADDER ELEMENT OVER IMAGE AND METHOD OF MANUFACTURING THE ARTICLE

CROSS-REFERENCE TO RELATED APPLICATION

This application claims the benefit of U.S. Provisional Application No. 62/144,554 filed Apr. 8, 2015, which is hereby incorporated by reference in its entirety.

TECHNICAL FIELD

The present teachings generally include an article that comprises a bladder having an image and an overlay aligned with the image and secured to the bladder element, and a method of manufacturing the article.

BACKGROUND

Clothing, an accessory, and/or athletic wear are often a source of expression for the wearer. The clothing, accessory, and/or athletic wear may provide an association with a team, coordinate with another item, or provide the owner or user with an attractive or customized item.

Footwear typically includes a sole configured to be located under a wearer's foot to space the foot away from the ground or floor surface. Footwear sometimes utilizes polyurethane foam or other resilient materials in the sole to provide cushioning.

DESCRIPTION

Figure 1:
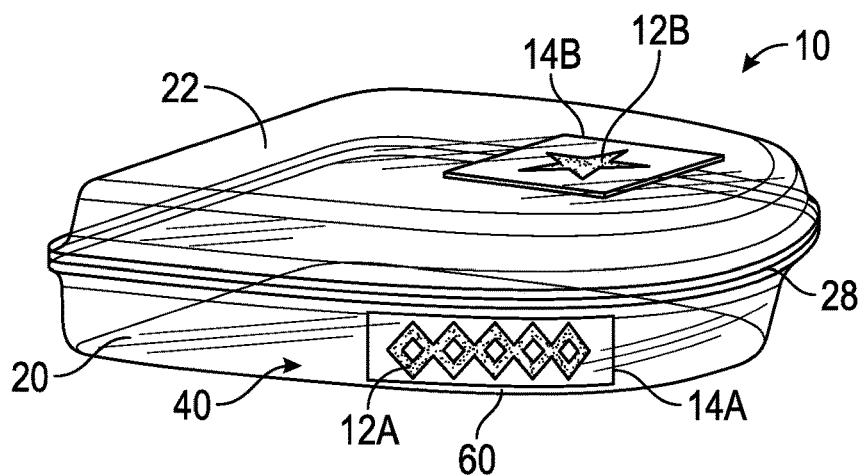
FIG. 1 is a schematic illustration in perspective view of a first embodiment of a bladder element having images applied thereon, and overlays secured to the bladder element over the images.
Figure 2:
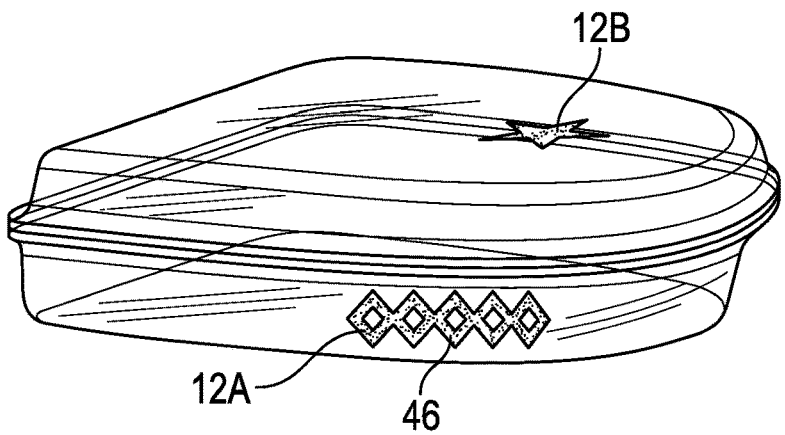
FIG. 2 is a schematic illustration in perspective view of the bladder element of FIG. 1 with the overlays removed.

A method of manufacturing an article comprises forming a fluid-filled bladder element from polymeric material, and securing an overlay to the polymeric material. At least one portion of the overlay is substantially transparent, and an image on one of the polymeric material and the overlay is aligned with the at least one portion of the overlay that is substantially transparent. The method comprises assembling the fluid-filled bladder element in the article so that a first portion of the fluid-filled bladder element and the image are exposed to view through the at least one portion of the overlay that is substantially transparent, and a second portion of the fluid-filled bladder element is blocked from view by the article.

In one embodiment, the method includes applying the image to the first polymeric sheet prior to securing the overlay to the first polymeric sheet. In another embodiment, the image is on the overlay and is transferred to the fluid-filled bladder element during forming of the fluid-filled bladder element.

In one embodiment, the method may include forming the fluid-filled bladder element, and the overlay may be secured to an outer surface of the bladder element after forming the bladder element. Forming the fluid-filled bladder element in the mold assembly may include at least one of thermoforming or vacuum forming. Securing the overlay to the polymeric material may be by adhering the overlay to the outer surface of the fluid-filled bladder element, and may include placing an adhesive on one or both of the overlay or the outer surface of the fluid-filled bladder element prior to placing the overlay on the outer surface of the bladder element. The adhesive forms an adhesive layer that secures the overlay to the fluid-filled bladder element after the overlay is placed on the fluid-filled bladder element. The fluid-filled bladder element may be formed with a curved portion, and the overlay may be on the curved portion.

In one embodiment, the method may include placing the overlay in a mold assembly with the polymeric material and forming the fluid-filled bladder element from the polymeric material in the mold assembly while the overlay is also present in the mold assembly. For example, placing the overlay in the mold assembly may include placing the overlay on a mold surface of the mold assembly. Additionally, the polymeric material may comprise a first polymeric sheet, and the method may include placing the first polymeric sheet in the mold assembly after placing the overlay in the mold assembly.

In one embodiment, a releasable film is attached to the overlay and is in contact with the mold surface when the overlay is placed in the mold assembly. The method may include removing the releasable film from the overlay after the bladder element is formed.

Securing the overlay to the polymeric material may include thermally bonding the overlay and the first polymeric sheet by heating the overlay and the polymeric sheet in the mold assembly during forming of the fluid-filled bladder element. In one embodiment, the image may be initially on the overlay, and the image may be transferred from the overlay to the first polymeric sheet during thermal bonding of the overlay and the first polymeric sheet to one another.

In one embodiment, the polymeric material further comprises a second polymeric sheet. The method may further comprise placing the second polymeric sheet in the mold assembly and bonding the first polymeric sheet to the second polymeric sheet to form a peripheral seam that at least partially seals a fluid-filled cavity of the bladder element. The overlay may be spaced apart from the seam on the bladder element. Bonding of the first and second polymeric sheets may be by thermal bonding, compression bonding, radio-frequency welding, or other bonding method, including by the use of adhesive.

Spacing of the overlay apart from the seam allows the fluid-filled bladder element to be assembled in the article so that the seam is covered by the article but the overlay is uncovered. For example, the article may have an opening, and the fluid-filled bladder element may be assembled in the article so that the image and the portion of the overlay that is substantially transparent are aligned with and exposed to view through the opening. The article may be an article of footwear having a sole assembly and an upper, wither of which may include the opening, and the fluid-filled bladder element may be secured to the sole assembly. The sole assembly may include at least one of a midsole or an outsole, and the opening may be in the midsole or the outsole.

An outsole, at least one portion of which is substantially transparent, may be secured to the fluid-filled bladder element so that the at least one portion of the outsole that is substantially transparent is aligned with the image and the image is exposed to view through the at least one portion of the overlay that is substantially transparent.

In an embodiment, the overlay is secured to at least a portion of a bottom surface and at least a portion of a side surface of the fluid-filled bladder element to support the fluid-filled bladder element. In such an embodiment, the overlay may have a first stiffness and the polymeric material may have a second stiffness, with the first stiffness at least ten percent greater than the second stiffness. Alternatively or in addition, the overlay may have a first thickness and the first polymeric sheet may have a second thickness, with the first thickness at least ten percent greater than the second thickness.

In an embodiment, the overlay has a first softness and the fluid-filled bladder element has a second softness greater than or equal to the first softness. In another embodiment, the overlay has a first softness and the fluid-filled bladder element has a second softness less than or equal to the first softness.

The polymeric material used to form the fluid-filled bladder element may be a variety of materials. For example, the polymeric material may comprise a thermoplastic polymeric material. In one embodiment, the thermoplastic polymeric material may be a thermoplastic polyurethane (TPU). In one embodiment, the polymeric material comprises a first polymeric sheet, and the TPU is present on at least an outer surface of the first polymeric sheet. The first polymeric sheet may comprise a multi-layer polymeric sheet. The multi-layer polymeric sheet may be a laminate membrane that comprises at least a first layer comprising the TPU, and at least a second layer comprising a gas barrier polymer. The gas barrier polymer may comprise an ethylene-vinyl alcohol copolymer. In one embodiment, the at least a first layer consists essentially of the TPU, and the at least a second layer consists essentially of the ethylene-vinyl alcohol copolymer.

The overlay may be a variety of different materials. For example, the overlay may comprise a TPU. The overlay and the first polymeric material may comprise the same material. The overlay may comprise a polyurethane, a polyester, or both. The overlay may comprise a woven fabric, a nonwoven fabric, a synthetic leather, or any combination thereof. The overlay may comprise a synthetic leather comprising a polyurethane coating over a polyester backing layer. The nonwoven fabric may comprise a nonwoven polyurethane fabric comprising thermoplastic polyurethane filaments. The nonwoven polyurethane fabric may have a fused region thereon that establishes a texture or an image on the overlay. The overlay may comprise a metal foil such as a TPU-backed metal foil.

The bladder element may have an outer surface with a first texture having a first level of roughness, and the overlay may have an outer surface at least a portion of which has a second texture having a second level of roughness at least ten percent greater than the first level of roughness.

Within the scope of the present teachings, an article comprises a fluid-filled bladder element comprising a polymeric material. A first portion of the fluid-filled bladder element has an image. An overlay is secured to the fluid-filled bladder element. At least one portion of the overlay is substantially transparent and is aligned with the image. The first portion of the fluid-filled bladder element and the image are exposed to view through the at least one portion of the overlay that is substantially transparent, and a second portion of the fluid-filled bladder element is blocked from view by the article. In one embodiment, the image is on an outer surface of the fluid-filled bladder element.

The overlay may be secured to an outer surface of the fluid-filled bladder element. In one embodiment, the outer surface of the fluid-filled bladder element has a curved portion, and the overlay is secured to the curved portion. The article may include an adhesive layer securing the overlay to the fluid-filled bladder element.

In one embodiment of the article, the fluid-filled bladder element comprises a first polymeric sheet, and a second polymeric sheet is bonded to the first polymeric sheet at a peripheral seam that partially seals a fluid cavity between the first polymeric sheet and the second polymeric sheet. The overlay may be spaced from the peripheral seam.

The article may be an article of footwear that further comprises a sole assembly with the fluid-filled bladder element secured to the sole assembly. In one embodiment, the peripheral seam is covered by the sole assembly.

The article of footwear may comprise an outsole that is secured to the fluid-filled bladder element, and that has at least one substantially transparent portion that is aligned with the image.

In an embodiment, the article is an article of footwear having a sole assembly that includes an outsole with an opening. The fluid-filled bladder element is secured to the outsole so that the image and the at least one portion of the overlay that is substantially transparent are aligned with the opening and exposed to view through the opening.

Similarly, in an embodiment, the article is an article of footwear having a sole assembly that includes a midsole with an opening. The fluid-filled bladder element is secured to the midsole so that the image and the at least one portion of the overlay that is substantially transparent are aligned with the opening and exposed to view through the opening.

Similarly, in an embodiment, the article is an article of footwear that includes a sockliner with an opening. The fluid-filled bladder element is secured to the article so that the image and the at least one portion of the overlay that are substantially transparent are aligned with the opening and exposed to view through the opening.

The various methods and articles described herein provide fluid-filled bladder elements, such as in an article of footwear, that have images covered and protected by a substantially transparent overlay. The methods and articles enable the image to be exposed to view through the overlay. Optionally, a peripheral seam formed in the bladder element may be covered by the article.

In one embodiment of the article, a colored medium applied to the fluid-filled bladder element established the image. Optionally, the colored medium may be applied to the fluid-filled bladder element after the fluid-filled bladder element is formed. The colored medium may comprise reflective particles. The colored medium may comprise ink. For example, the ink may comprise at least one of an isocyanate group, an isocyanate-reactive group, an alcohol-soluble ink, a polyamide ink, a dye-containing ink, an acrylic ink, or a water-based ink.

The above features and advantages and other features and advantages of the present teachings are readily apparent from the following detailed description of the modes for carrying out the present teachings when taken in connection with the accompanying drawings.

"A," "an," "the," "at least one," and "one or more" are used interchangeably to indicate that at least one of the items is present. A plurality of such items may be present unless the context clearly indicates otherwise. All numerical values of parameters (e.g., of quantities or conditions) in this specification, unless otherwise indicated expressly or clearly in view of the context, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, a disclosure of a range is to be understood as specifically disclosing all values and further divided ranges within the range. All references referred to are incorporated herein in their entirety.

The terms "comprising," "including," and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. The term "any of" is understood to include any possible combination of referenced claims of the appended claims, including "any one of" the referenced claims.

Those having ordinary skill in the art will recognize that terms such as "above," "below," "upward," "downward," "top," "bottom," etc., are used descriptively relative to the figures, and do not represent limitations on the scope of the invention, as defined by the claims.

Referring to the drawings, wherein like reference numbers refer to like components throughout the several views, FIG. 1 shows a fluid-filled bladder element 10 that has an image 12A thereon. An overlay 14A is in contact with and secured to the bladder element 10 over the image 12A. As further described herein, at least a portion of the overlay 14A, or the entire overlay 14A, is substantially transparent. The transparent portion is aligned with the image 12A prior to securing the overlay 14A to the bladder element 10. In the embodiment shown, the entire overlay 14A is substantially transparent. The image 12A can thus be viewed through the overlay 14A and is protected by the overlay 14A from scratching or scuffing. Additionally, as further described herein, the overlay, such as overlay 14A, can also add another image or a texture for aesthetic or tactile enhancement.

As used herein, a "fluid" includes a gas, including air, an inert gas such as nitrogen, or another gas. Accordingly, "fluid-filled" includes "gas-filled". As used herein, a component is "substantially transparent" if it has a luminous transmittance (i.e., a percentage of incident light that is transmitted) of at least 80 percent and haze (i.e., percentage of transmitted light that is scattered) of not more than 56 percent. The various materials used for the bladder element 10, and other embodiments of bladder elements discussed herein, may be substantially transparent. Those skilled in the art will readily understand a variety of methods to determine luminous transmittance and haze of an object, such as the bladder element 10. For example, the luminous transmittance and haze of the bladder element 10 can be determined according to American Society for Testing and Materials (ASTM) Standard D1003-00, Standard Test Method for Haze and Luminous Transmittance of Transparent Plastics. Additionally, in some embodiments, the bladder element 10 may have a tinted color.

In addition to the portion of the overlay 14A, and other embodiments of overlays described herein, the various materials used for the bladder element 10, and other embodiments of bladder elements discussed herein, may be substantially transparent. In the embodiment shown, the entire bladder element 10 to which the overlay 14A is secured is substantially transparent prior to any optional application of colored medium 46 as discussed herein. Additionally, in some embodiments, the substantially transparent overlay 14A or bladder element 10, or both, may be have a tinted color.

Figure 6:
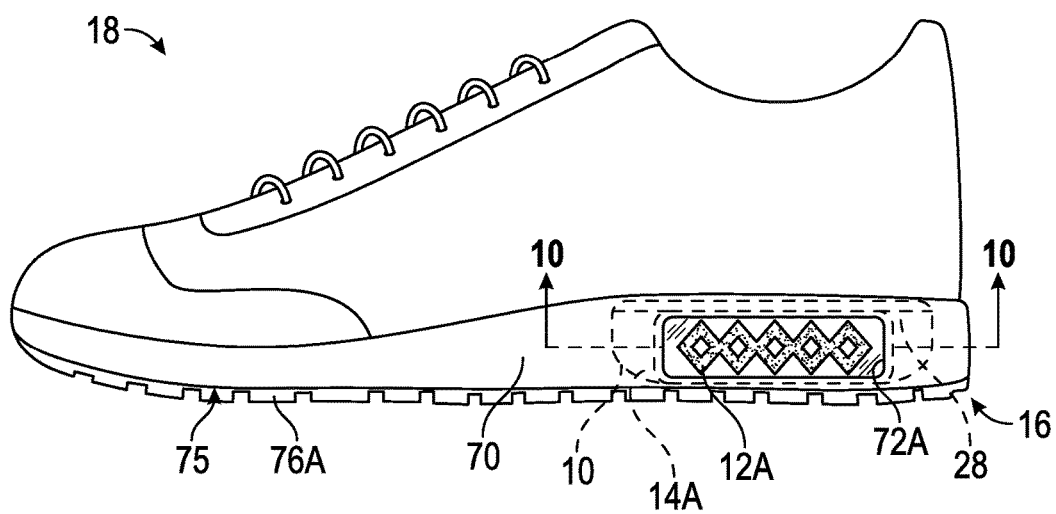
FIG. 6 is a schematic side view illustration of an article of footwear having a sole assembly with the bladder element of FIG. 1 secured to the sole assembly.

The bladder element 10 with images 12A, 12B, 12C and overlays 14A, 14B, 14C may be included in a sole assembly 16 of an article of footwear 18. As shown in FIG. 6, the article of footwear 18 is an athletic shoe, and the bladder element 10 is a cushioning element. In other embodiments, the sole assembly 16 could be for an article of footwear that is a dress shoe, a work shoe, a sandal, a slipper, a boot, or any other category of footwear. Alternatively, the fluid-filled bladder element 10 could be used as a cushioning element in another article, such as but not limited to a shoulder strap, a backpack, a shoulder pad, a glove, an elbow pad, a knee pad, a shin guard, or other apparel, or a sports ball. The bladder element 10 is formed from a first polymeric sheet 20, and a second polymeric sheet 22 secured to one another to define a fluid-filled cavity 23 (best shown in FIG. 16) that sealingly retains a fluid such as gas, as described herein.

Figure 3:
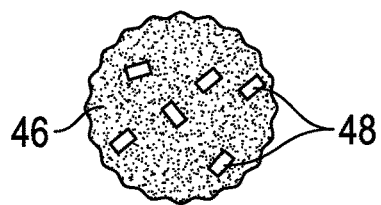
FIG. 3 is a schematic illustration in fragmentary view of a portion of one of the images of FIG. 2.

Within the scope of the present teachings, the bladder element 10 is formed from a first polymeric sheet 20 and a second polymeric sheet 22. In another embodiment, the bladder element may be formed from a single polymeric sheet. Although the bladder element 10 may only have one image, such as image 12A applied to the first polymeric sheet 20, in the embodiment of FIG. 1, the bladder element 10 has multiple images, including additional images 12B, and 12C. As used herein, an "image" may comprise one or more of numbers, letters, pictorial representations, and patterns, and may be created by ink, dye, or other mediums, and may have multiple colors, or contrasting textures. In the embodiment shown in FIG. 1, the image 12A is a diamond pattern, and is provided by a colored medium 46 applied to the fluid-filled bladder element 10. As indicated in the close-up view in FIG. 3, the colored medium 46 includes an ink as a base and has reflective particles 48. The ink of the colored medium 46 may comprise at least one of an isocyanate group, an isocyanate-reactive group, an alcohol-soluble ink, a polyamide ink, a dye-containing ink, an acrylic ink, or a water-based ink. The reflective particles 48 allow for light to be cast back towards its source. The reflective particles 48 may also allow light to be scattered. In such embodiments, this provides a safety feature for low-light or full-light environments. The reflective particles 48 can be metal flakes or may include a phosphorescent material so that the reflective particles are a "glow-in-the-dark" material. In embodiments with reflective particles 48, a curved portion 60 of the inflated bladder element 10, discussed with respect to FIG. 10, facilitates reflecting of the light by the reflective particles 48. For example, during a normal gait, a foot on which the article of footwear 18 is worn is repeatedly lifted and planted. The motion of the normal gait creates an additional "flash" of reflected light from the reflective particles 48 and makes the article of footwear 18 more noticeable.

A second image 12B is applied to the second polymeric sheet 22, and is covered by a second overlay 14B that is aligned with the image 12B and secured to the second polymeric sheet 22. In the embodiment shown, the second image is a star shape. The second overlay 14B also has at least a portion that is substantially transparent so that the image 12B aligns with the substantially transparent portion and can be viewed through the overlay 14B. In the embodiment shown, the entire overlay 14B is substantially transparent. The second image 12B can be of the same or a different colored medium as described with respect to image 12A.

The third image 12C is applied to the first polymeric sheet 20, and is covered by a third overlay 14C that is aligned with the image 12C and secured to the first polymeric sheet 20. In the embodiment shown, the third image includes a number and a pictorial representation of a bird. For example, the third image may be a player number and a team logo. The third overlay 14C also has at least a portion that is substantially transparent so that the third image 12C aligns with the substantially transparent portion and can be viewed through the overlay 14C. In the embodiment shown, the entire overlay 14C is substantially transparent. The third image 12C can be of the same or a different colored medium as described with respect to image 12A. It is to be understood that the colored medium 46 could be of different colors or materials at the different areas of application on the first and second polymeric sheets 20, 22.

Figure 4:
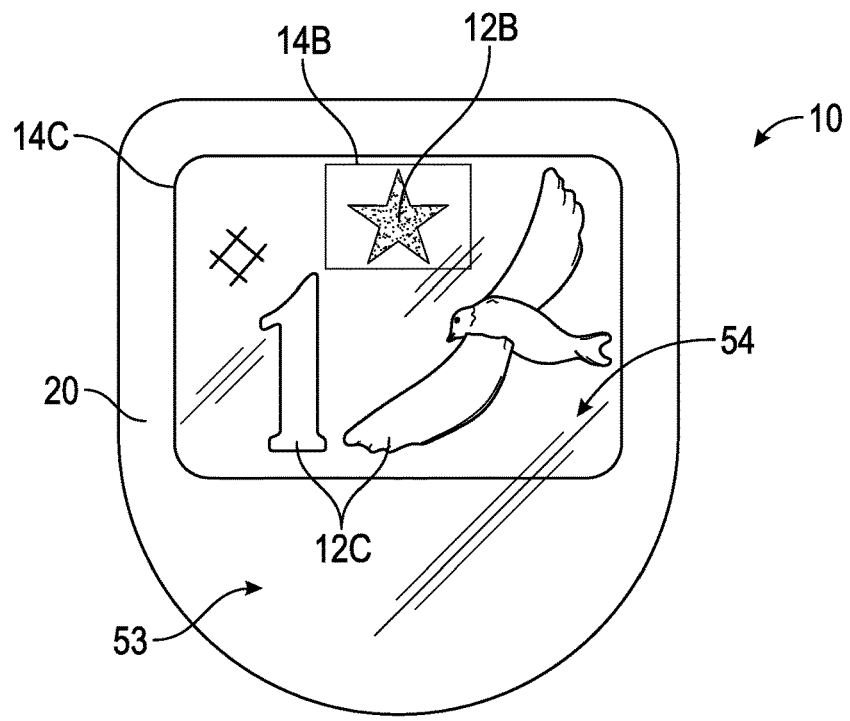
FIG. 4 is a schematic illustration in bottom view of the bladder element of FIG. 1 showing another overlay and image.
Figure 5:
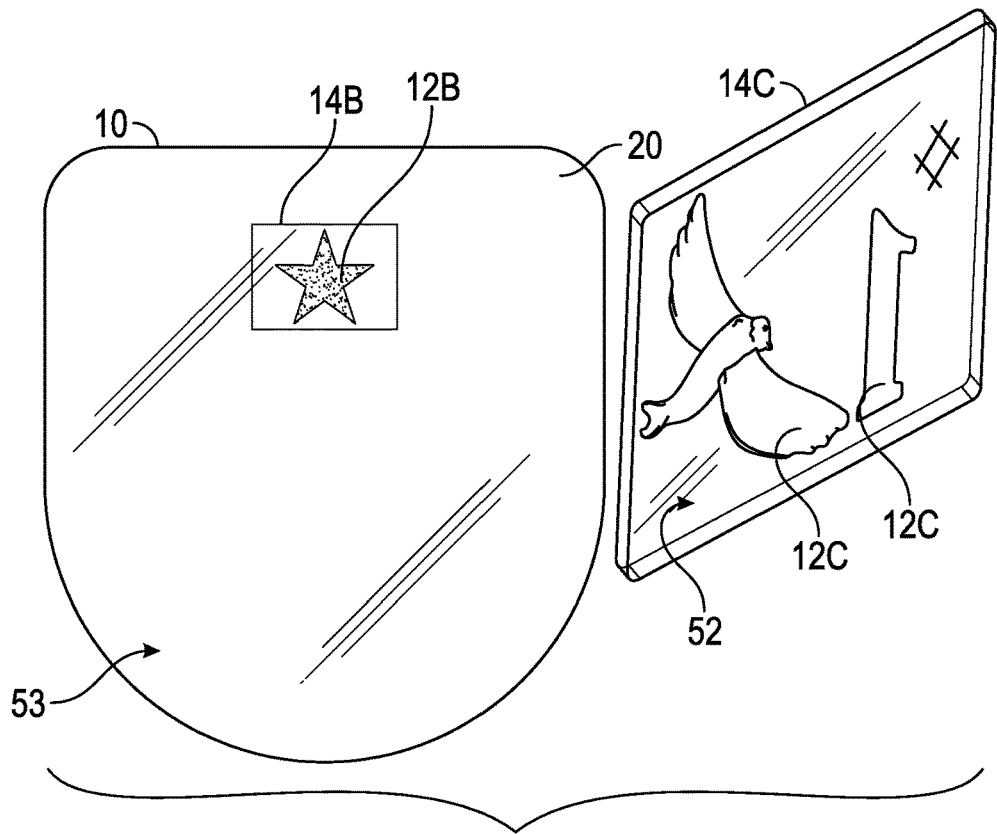
FIG. 5 is a schematic illustration in exploded top view of the article and one of the overlays of FIG. 1.

As is apparent in FIG. 5, the third image 12C is originally applied to a surface 52 of the overlay 14C that is placed into contact with the first polymeric sheet 20. The image 12C is applied in reverse on the surface 52 of the overlay 14C. That is, the parts of the image are arranged on the surface 52 with a reversal of right and left, as it would appear if seen in a mirror. When the overlay 14C is secured to the first polymeric sheet 20 with the surface 52 against the outer, bottom surface 53 of the first polymeric sheet 20, the image 12C appears through the overlay 14C without the parts reversed right to left. Securing the overlay 14C to the bladder element 10 may transfer the image 12C from the overlay 14C to the surface of the first polymeric sheet 20, such as if heat is used to thermally bond the overlay 14C to the first polymeric sheet 20. As shown in FIGS. 4 and 5, although the second image 12B is on the second polymeric sheet 22, the second image 12B can be viewed from an exterior of the bladder element 10 through the overlay 14C and the first polymeric sheet 20. In another embodiment, the bladder element may be formed from a single polymeric sheet.

Figure 10:
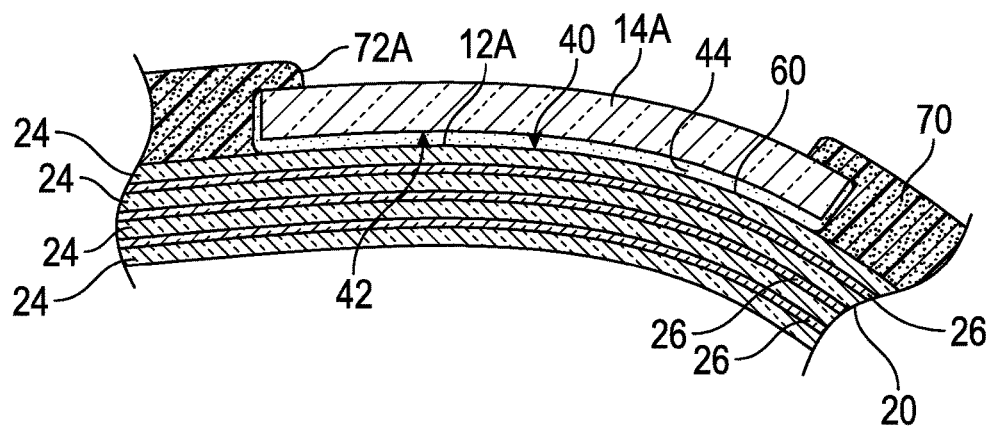
FIG. 10 is a schematic illustration in fragmentary cross-sectional view of the article of footwear of FIG. 6 taken at lines 10-10 in FIG. 6.
Figure 11:
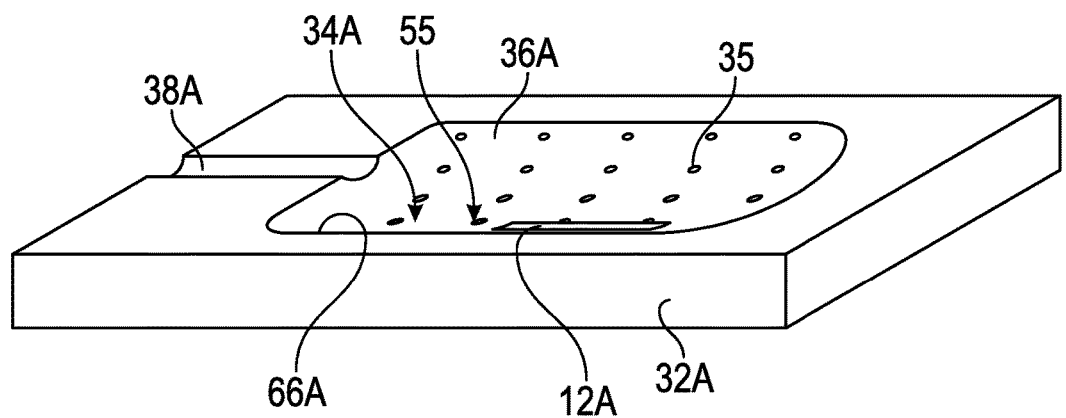
FIG. 11 is a schematic perspective illustration of a first mold half of a mold assembly with one of the overlays of FIG. 1.

The fluid-filled bladder element 10 can be formed from a variety of polymeric materials. In an embodiment shown and described at least with respect to FIGS. 1-5, the bladder element 10 can be formed from any of various polymeric materials that can retain a fluid at a predetermined pressure, including a fluid that is a gas, such as air, nitrogen, or another gas. For example, the bladder element 10 can be thermoplastic polymeric material. The bladder element 10 can be a urethane, polyurethane, polyester, polyester polyurethane, and/or polyether polyurethane. Moreover, the bladder element 10 can be formed of layers of different materials. In an embodiment as illustrated in FIG. 1, the bladder element 10 is formed from a first polymeric sheet 20 and a second polymeric sheet 22. FIG. 10, which is a close-up fragmentary cross-section portion of the bladder element 10 in an article of footwear 18, shows that the first polymeric sheet 20 is a laminate membrane formed from thin films having one or more first layers 24 that comprise thermoplastic polyurethane layers 24 and that alternate with one or more second layers 26, also referred to herein as barrier layers, that comprise a copolymer of ethylene and vinyl alcohol (EVOH) that is impermeable to the pressurized fluid contained therein as disclosed in U.S. Pat. No. 6,082,025 to Bonk et al., which is incorporated by reference in its entirety. The second polymeric sheet 22 may be formed from the same materials shown and described in FIG. 10 with respect to the first polymeric sheet 20. The first layer 24 may be arranged to form an outer surface of the first polymeric sheet 20. That is, the outermost first layer 24 shown in FIG. 10 may be the outer surface 40 of the bladder element 10 to which the overlay 14A is secured. The bladder element 10 may also be formed from a material that includes alternating layers of thermoplastic polyurethane and ethylene-vinyl alcohol copolymer, as disclosed in U.S. Pat. Nos. 5,713,141 and 5,952,065 to Mitchell et al. which are incorporated by reference in their entireties. Alternatively, the layers may include ethylene-vinyl alcohol copolymer, thermoplastic polyurethane, and a regrind material of the ethylene-vinyl alcohol copolymer and thermoplastic polyurethane. The bladder element 10 may also be a flexible microlayer membrane that includes alternating layers of a gas barrier material such as second layers 26 and an elastomeric material such as first layers 24, as disclosed in U.S. Pat. Nos. 6,082,025 and 6,127,026 to Bonk et al. which are incorporated by reference in their entireties. Additional suitable materials for the bladder element 10 are disclosed in U.S. Pat. Nos. 4,183,156 and 4,219,945 to Rudy which are incorporated by reference in their entireties. Further suitable materials for the bladder element 10 include thermoplastic films containing a crystalline material, as disclosed in U.S. Pat. Nos. 4,936,029 and 5,042,176 to Rudy, and polyurethane including a polyester polyol, as disclosed in U.S. Pat. Nos. 6,013,340, 6,203,868, and 6,321,465 to Bonk et al. which are incorporated by reference in their entireties. In selecting materials for the bladder element 10, engineering properties such as tensile strength, stretch properties, fatigue characteristics, dynamic modulus, and loss tangent can be considered. The thicknesses of sheets 20, 22 of materials used to form the bladder element 10 can be selected to provide these characteristics. For example, in various embodiments, the bladder element 10 may have a Shore A hardness of about 20 to about 100 when inflated. In one embodiment, the overlay 14A has a first softness and the fluid-filled bladder element 10 has a second softness greater than or equal to the first softness. In another embodiment, the overlay 14A has a first softness and the fluid-filled bladder element 10 has a second softness less than or equal to the first softness.

Figure 12:
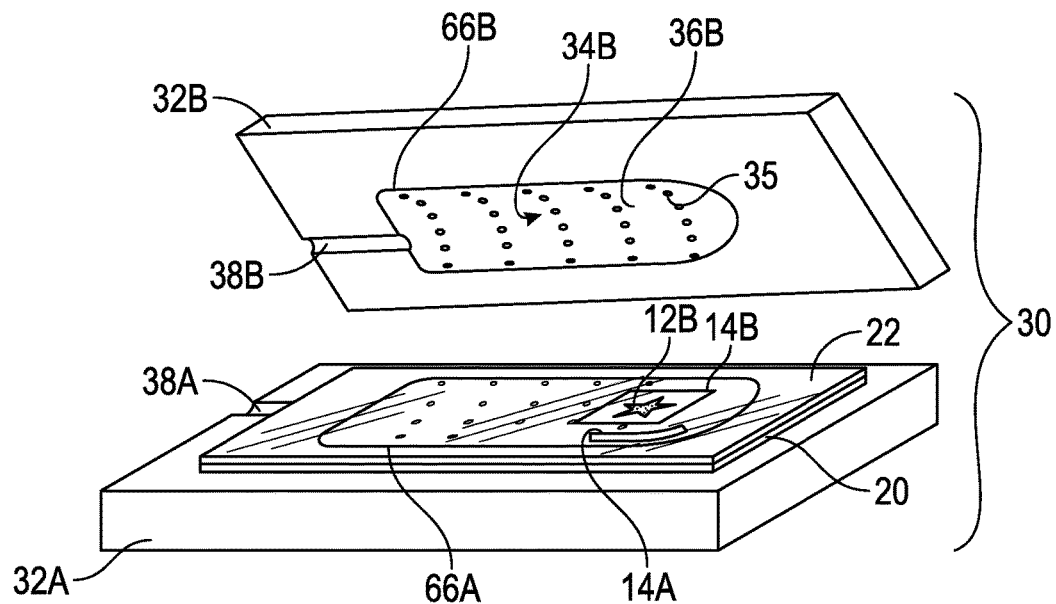
FIG. 12 is a schematic illustration in exploded perspective view of a mold assembly including the mold half of FIG. 11 with first and second polymeric sheets for the bladder element of FIG. 1 and showing some of the overlays.
Figure 13:
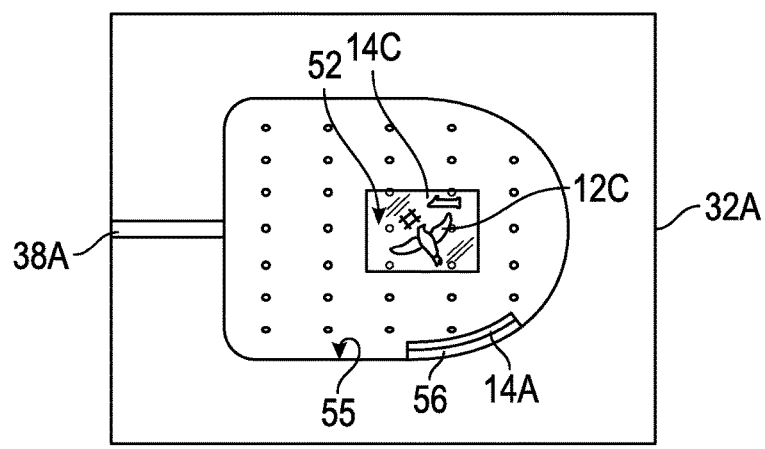
FIG. 13 is a schematic illustration in schematic top view of the mold half of FIG. 11 showing some of the overlays of FIGS. 1 and 4.
Figure 14:
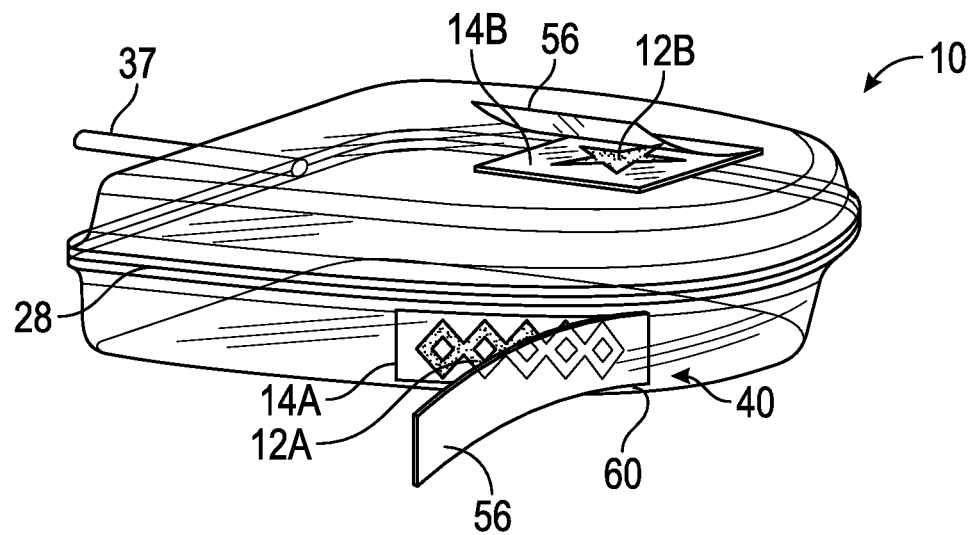
FIG. 14 is a schematic perspective illustration of the bladder element of FIG. 1 showing a fill tube and showing some of the overlays and releasable film layers at the overlays.

With reference to FIG. 1, the first polymeric sheet 20 is bonded to the second polymeric sheet 22 to form a peripheral seam 28 around a periphery of the bladder element 10. The seam 28 seals the internal cavity 23 of the bladder element 10, assuming the fill tube 37 shown and described with respect to FIG. 14 is plugged, and helps the bladder element 10 retain its shape. The first and second polymeric sheets 20, 22 can be bonded to one another by forming in a mold assembly 30 as shown in FIG. 12. The mold assembly 30 includes a first mold half 32A and a second mold half 32B. The first mold half 32A has a mold cavity portion 36A with a mold surface 34A. The second mold half 32B has a mold cavity portion 36B with a mold surface 34B. In one embodiment, the overlay 14A is placed on the mold surface 34A in the mold cavity portion 36A of the first mold half 32A. The overlay 14A is placed on a curved portion 55 of the mold surface 34A. The third overlay 14C can also be placed in the mold assembly 30 with the surface 54 against the mold surface 34A so that surface 52 is exposed, as shown in FIG. 13. The overlays 14A, 14C are positioned and spaced apart from one another in the same orientation as they will be positioned and spaced from one another when secured to the bladder element 10.

Optionally, a respective releasable film 56 can be attached to any or each of the overlays 14A, 14B, and 14C. The releasable film 56 is placed in contact with the mold surface when the overlay 14A, 14B, 14C is placed in the mold assembly 30. The releasable film 56 may be a material that will not stick to the mold surfaces 34A, 34B to enable the bladder element 10 with the overlays 14A, 14B, and 14C secured thereto to be easily released from the mold assembly 30, and also serves to protect the images 12A, 12B from direct contact with the mold surfaces 34A, 34B. Suitable materials for the releasable film 56 include polymeric films or metal foils having a relatively low surface energy coating such as a silicone, polyolefin, or polybutadiene coating. Because the image 12C is on surface 52 rather than surface 54, image 12C is not in contact with the mold surface 34A. The releasable film 56 is peeled off and removed from the bladder element 10 after the bladder element 10 is formed.

After the overlays 14A, 14C are placed on the surface 34A of the first mold cavity portion 36A, the first polymeric sheet 20 is then laid on the first mold half 32A, across the mold cavity portion 36A. The second polymeric sheet 22 is placed on the first polymeric sheet 20. Both the first and the second polymeric sheets 20, 22 are in their original, generally flat form when initially placed on the mold half 32A. The second overlay 14B can be placed on the second polymeric sheet 22. Alternatively, in other embodiments, any or all of the overlays 14A, 14B, and 14C can be secured to the polymeric sheets 20 or 22 before the polymeric sheets 20, 22 are placed in the mold assembly 30. In another alternative embodiment, the bladder element 10 can be formed in the mold assembly 30 without the overlays 14A, 14B, 14C, and any or all of the overlays 14A, 14B, and 14C can be secured to the bladder element 10 with adhesive after the bladder element 10 is formed. In other embodiments, any or all of the overlays 14A, 14B, and 14C can be secured to the inner surfaces of the respective sheets 20, 22.

After the first and second polymeric sheets 20, 22 and the overlays 14A, 14B, 14C are placed in the mold assembly 30, the mold assembly 30 is closed. A forming process is then used to shape the first and second polymeric sheets 20, 22 to the mold halves 32A, 32B, such as by the use of temperature and pressure control. For example, the forming process may include any or all of thermoforming, vacuum forming, compression forming, or radio-frequency welding. Vacuum ports 35 are shown extending through the mold halves 32A, 32B, and a vacuum may be applied through the ports 35 to pull the first and second polymeric sheets 20, 22 against the mold surfaces 34A, 34B in the mold cavity portions 32A, 32B. The sheets 20, 20 may be heated by the mold assembly 30 during the forming process. Additionally, a fill tube 37, shown in FIG. 14, may be formed by recesses 38A, 38B in the mold halves 32A, 32B that mate when the mold assembly 30 is closed. The portion of the sheets 20, 22 surrounding the mold cavity portions 36A, 36B are bonded to one another by at least one of thermal bonding during thermoforming, radio frequency welding, or compression bonding, i.e., through pressure applied by the mold halves 32A, 32B or by a separate machine after removal from the mold halves 32A, 32B.

Because the overlays 14A, 14C are placed on the mold surface 34A and the overlay 14B is placed on the second sheet 22 prior to forming the bladder element 10, the overlays 14A, 14B, and 14C become secured to an outer surface 40 of the bladder element 10. Depending on the material used for the overlays 14A, 14B, 14C, the overlays 14A, 14B, 14C may be secured to the bladder element by thermal bonding during the thermoforming process of the bladder element 10. Optionally, as indicated in FIG. 10, adhesive may be placed on one or both of the outer surface 40 of the bladder element 10 or the inner surface 42 of the overlay 14A. The adhesive forms an adhesive layer 44 that secures the overlay 14A to the bladder element 10. Adhesive may be used in a similar manner to secure the overlays 14B and 14C to the bladder element 10.

After the sheets 20, 22 are formed to the contours of the mold assembly 30 in the mold cavity portions 36A, 36B and, if heated, sufficiently cooled, the mold halves 32A, 32B are then separated, and excess material of the sheets 20, 22 around the periphery of the seam 28 is trimmed. The releasable film 56, if used, is then removed from the overlays 14A, 14B, and 14C. FIG. 14 illustrates the releasable film 56 in the process of being released from the overlays 14A and 14B. The fill tube 37 formed at the recesses 38A, 38B may be used to inflate the bladder element 10 with gas at or above ambient pressure, and then the fill tube 37 may be plugged and trimmed so that the bladder element 10 is in its final, formed state.

Alternatively, instead of placing the overlay 14A in the mold assembly 30 to secure the overlay 14A to the bladder element 10, the bladder element 10 may be separately formed in the mold assembly 30, removed from the mold assembly 30, and then the overlay 14A can be secured to the outer surface 40 of the bladder element 10. Alternatively, any or all of the images 12A, 12B, 12C can be applied to the bladder element 10 after the bladder element 10 is formed and inflated.

Figure 9:
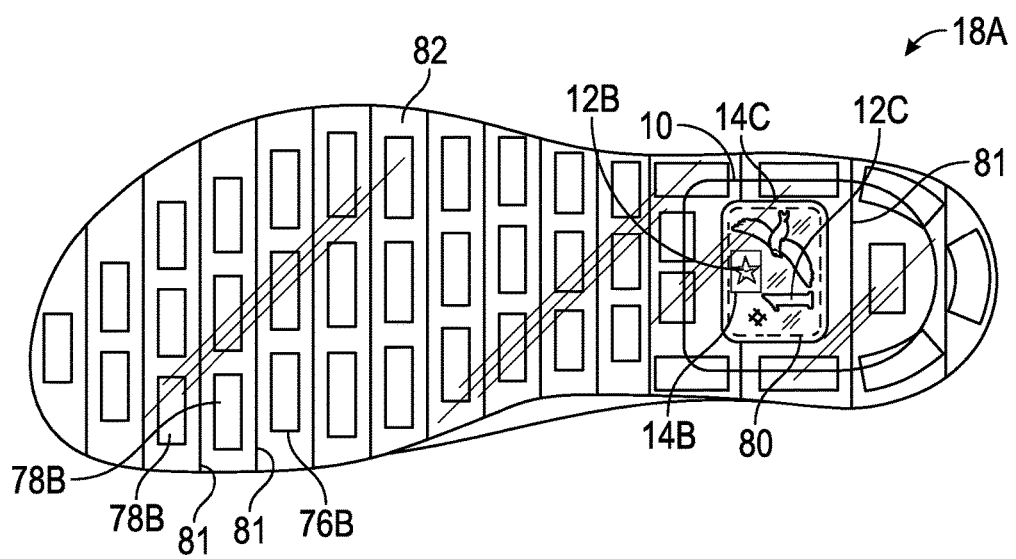
FIG. 9 is a schematic bottom view illustration of the article of footwear of FIG. 6 having an alternative embodiment of an outsole.

As best shown in FIGS. 1, 9 and 13, at least the image 12A and the overlay 14A are on a curved portion 60 of the outer surface 40 of the bladder element 10. Both the colored medium 46 used for the image 12A, such as the ink with reflective particles 48, and the material used for the overlay 14A, are sufficiently flexible to form to the shape of the curved portion 60. Additionally, the overlays 14A, 14B, 14C are each spaced from the seam 28 on the formed bladder element 10 due to their initial placement in the mold assembly 30 away from a perimeter 66A, 66B of the mold cavity portions 36A, 36B. The images 12A, 12B are applied on the first and second polymeric sheets 20, 22 so that they are also spaced apart from the peripheral seam 28, and the overlays 14A, 14B are aligned with the images 12A, 12B when secured to the bladder element 10 as described herein. All of the images 12A, 12B, 12C are thus spaced apart from the peripheral seam 28.

The bladder element 10 can be secured in the sole assembly 16 such as by bonding to a midsole 70 of the sole assembly 16. For example, the bladder element 10 can be bonded with adhesive to the formed midsole 70. Alternatively, the bladder element 10 can be placed in a midsole mold assembly (not shown), and the midsole 70 may be formed around the bladder element 10, such as by injecting foam into the midsole mold assembly. In still other embodiments, the bladder element 10 is secured to the sole assembly 16 by an interference fit. In all such embodiments, because the overlays 14A, 14B, 14C are spaced from the peripheral seam 28, the images 12A, 12B, 12C can be aligned with openings in the sole assembly 16 as described herein and/or in a footwear upper extending over the sole assembly, such as represented by an insole or sockliner 73 as described herein, while the seam 28 can be covered by the sole assembly 16. For example, as shown in FIGS. 6 and 10, the midsole 70 is formed with an opening 72A. The substantially transparent portion of the overlay 14A and image 12A are positioned at the opening 72A so that they are exposed at the exterior of the article of footwear 18, while the seam 28 is covered by the midsole 70 and is not exposed at the opening 72A. Stated differently, a first portion of the bladder element 10 including the image 12A is aligned with the opening 72A and exposed to view (i.e., such as a viewpoint of a side view as in FIG. 6) through the opening 72A. A second portion of the bladder element (i.e., the portion indicated with hidden lines in FIG. 6) is blocked from view by the midsole 70.

Figure 7:
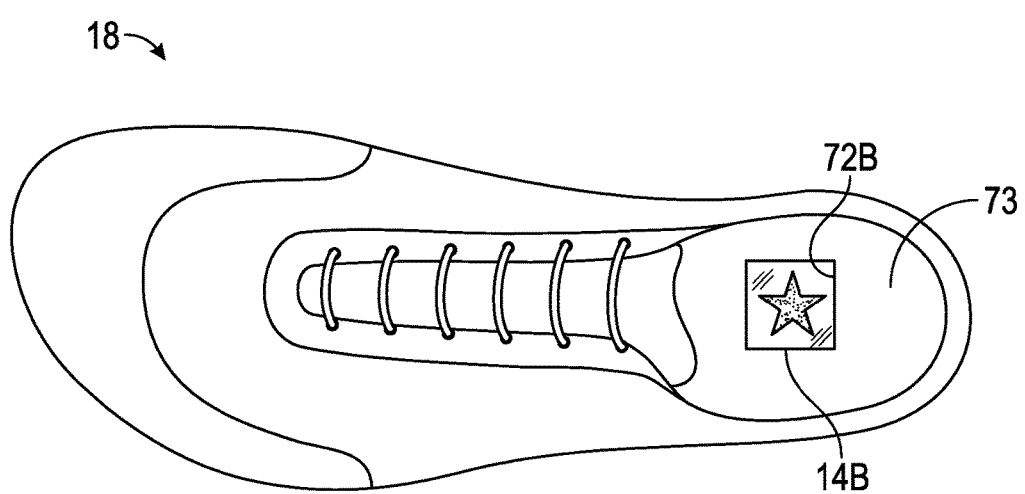
FIG. 7 is a schematic top view illustration of the article of footwear of FIG. 6.

In another example shown in FIG. 7, the sockliner 73 also has an opening 72B and the sole assembly 16 does not cover the overlay 14B so that the overlay 14B and the image 12B are aligned with and exposed to view through the opening 72B. The peripheral seam 28 is covered by and blocked from view by the article so that it is not exposed at the opening 72B.

Figure 8:
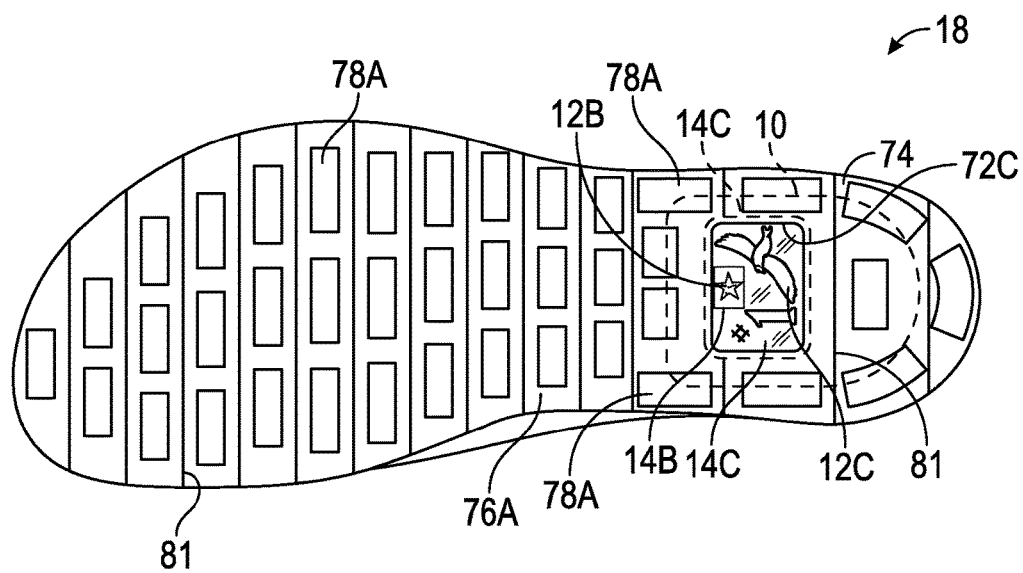
FIG. 8 is a schematic bottom view illustration of the article of footwear of FIG. 6 having a first embodiment of an outsole.

As is apparent in FIG. 8, the article of footwear 18 does not cover at least the substantially transparent portion of the overlay 14C secured to the bladder element 10 and the image 12C transferred to the bladder element 10 from the overlay 14C. The sole assembly 16 includes an outsole 76A secured to a lower surface 75 of the midsole 70 as also shown in FIG. 6. In one embodiment, the outsole 76A has an opening 72C that is aligned with the overlay 14C and the image 12C so that a first portion of the bladder element 10 with the overlay 14C and the image 12C are exposed to view at the exterior of the article of footwear 18 and may be viewed, such as when a wearer of the article of footwear 18 lifts a heel portion 74 of the article of footwear 18. A second portion of the bladder element 10 indicated by the hidden lines in FIG. 8 is covered by and blocked from view by the article of footwear 18. The outsole 76A is shown with tread elements 78A having bottom surfaces that form a ground contact surface of the article of footwear 18. The tread elements 78A can have various alternative shapes and can be arranged in various alternative arrangements. The outsole 76A shows grooves 81 formed in the outsole 76A.

FIG. 9 shows an alternative embodiment of an outsole 76B secured to the midsole 70 of FIG. 6 and to the bladder element 10. The outsole 76B has at least a portion 80, bounded by phantom lines, that is substantially transparent. The substantially transparent portion 80 is aligned with the overlay 14C so that the overlay 14C and the image 12C are exposed to view at an exterior of an article of footwear 18A, and may be viewed, such as when a wearer lifts the heel portion 74 of the article of footwear 18A. A remaining portion 82 of the outsole 76B, not bounded by the phantom lines, can also be substantially transparent. In the embodiment shown, the entire outsole 76B is substantially transparent. Alternatively, the remaining portion 82 could be opaque or not substantially transparent. The outsole 76B shows grooves 81 formed in the outsole 76B and a different arrangement of tread elements 78B. The article of footwear 18A has a different outsole 76B than the article of footwear 18, but is otherwise the same as the article of footwear 18.

Figure 15:
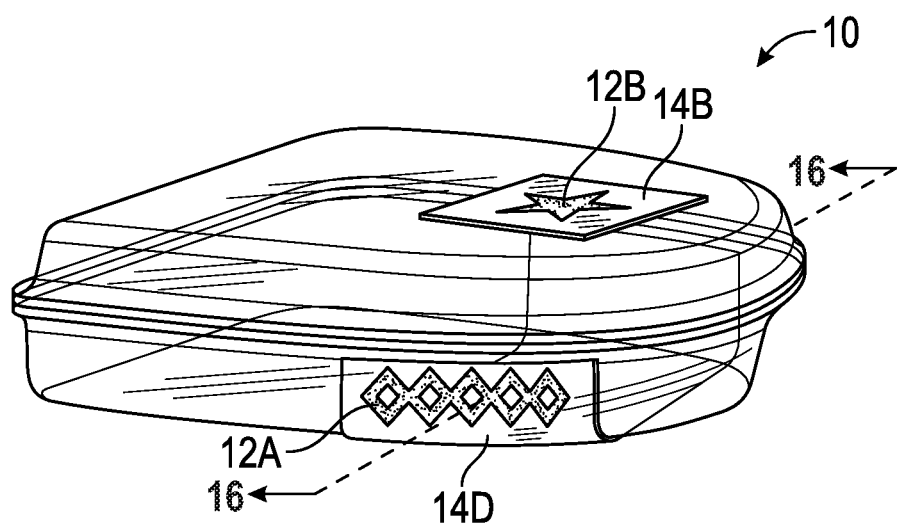
FIG. 15 is a schematic illustration in perspective view of the bladder element of FIG. 1 and a different overlay in accordance with an alternative aspect of the present teachings.
Figure 16:
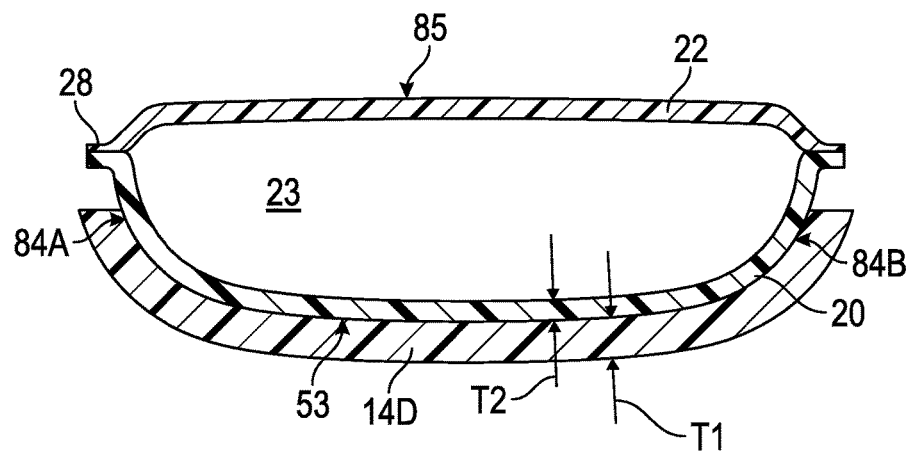
FIG. 16 is a schematic illustration in cross-sectional view of the bladder element and one of the overlays of FIG. 15 taken at lines 16-16 in FIG. 15.

FIGS. 15 and 16 show an alternative embodiment of an overlay 14D secured to the first polymeric sheet 20 of the bladder element 10, and having at least a portion that is substantially transparent and is aligned with the image 12A. The overlay 14D is secured to and surrounds a portion of a bottom surface 53 and portions of side surfaces 84A, 84B of the fluid-filled bladder element 10, functioning as a supportive cage around the fluid-filled bladder element 10. The bottom surface 53 and the side surfaces 84A, 84B are portions of the outer surface 40. The overlay 14D is able to support the fluid-filled bladder element 10 as a supportive cage because it is relatively thick and stiff in comparison to the bladder element 10. More specifically, the overlay 14D has a first stiffness. The first stiffness is at least 10 percent greater than the second stiffness. Additionally, the overlay 14D has a first thickness T1, indicated in FIG. 16, and the first polymeric sheet 20 has a second thickness T2. The first thickness T1 is at least 10 percent greater than the second thickness T2. The greater thickness T1 of the overlay 14D, in addition to its greater stiffness, enables it to provide substantial support to the bladder element 10 in the heel portion 74 of the article of footwear 18. In an alternative embodiment, one or multiple overlays in addition to overlay 14D could surround the bladder element 10. In other words, in addition to surrounding the bottom surface 53 and side surfaces 84A, 84B of the first polymeric sheet 20, the overlay 14D could extend to also surround the outer surface 85 of the second polymeric sheet 22 as well.

In any of the embodiments described herein, the overlays 14A, 14B, 14C, or 14D and the fluid-filled bladder element 10 may comprise the same material. For example, any of the overlays 14A, 14B, 14C, or 14D may be a multi-layer laminate such as shown in FIG. 10 having layers 24 of TPU alternating with layers 26 of a gas barrier polymer, such as EVOH. In one embodiment, the overlay 14A, 14B, 14C, or 14D comprises a polyurethane, a polyester, or both. In an alternative embodiment, the overlay 14A, 14B, 14C, or 14D comprises a TPU-backed metal foil.

Figure 17:
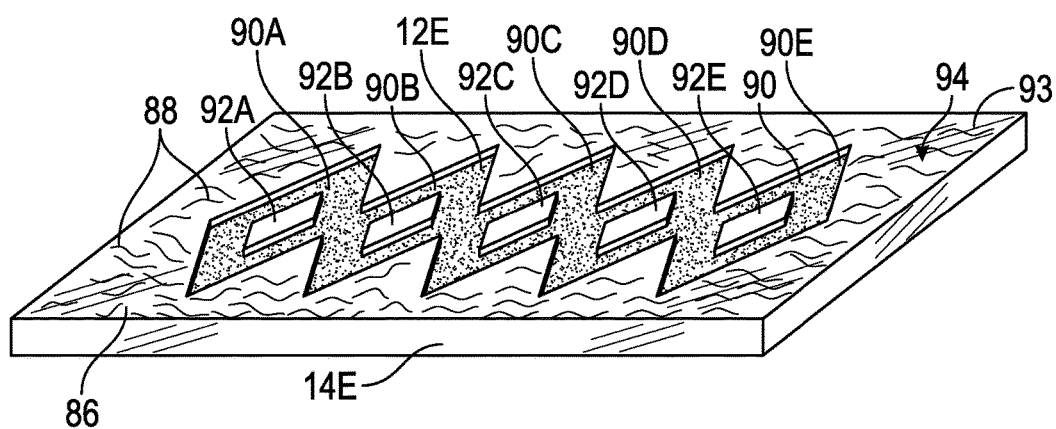
FIG. 17 is a schematic perspective illustration of an alternative embodiment of an overlay for the bladder element of FIG. 1 in accordance with an alternative aspect of the present teachings.

In alternative embodiments, any of the overlays 14A, 14B, 14C, or 14D comprises a woven fabric, a nonwoven fabric, a synthetic leather, or any combination thereof. For example, FIG. 17 shows an embodiment of an overlay 14E that can be used in place of any of the overlays 14A, 14B, 14C, or 14D on the bladder element 10. The overlay 14E is or includes a nonwoven polyurethane fabric 86 that includes thermoplastic polyurethane filaments 88. The overlay 14E is fused used using one or more hot dies each of which has a shape that is imparted as a fused region in the overlay, establishing a texture or an image. For example, multiple hot dies each having a diamond shape with a recessed diamond center may be used to create each fused region 90A, 90B, 90C, 90D, 90E in the overlay 14E. The combined fused regions 90 may be referred to as an image 12E. Alternatively, a single heated die having a more complex shape of five interconnected diamonds with recessed diamond centers can be used to create the fused regions 90A, 90B, 90C, 90D, 90E. The fused regions 90A, 90B, 90C, 90D, 90E are compressed portions of the overlay 14E. In other words, fused regions 90A, 90B, 90C, 90D, 90E are compressed relative to and fused to a greater degree than the surrounding portion 93 of the overlay 14E, and relative to the diamond shaped centers 92A, 92B, 92C, 92D, and 92E, so that the fused regions 90A, 90B, 90C, 90D, 90E also create a texture on the outer surface 94 of the overlay 14E. United States Patent Application Publication No. 2013/0068378 to Dua et al., which is incorporated by reference herein in its entirety, discloses nonwoven textile fabrics having polyurethane filaments, and a process of creating fused regions in the nonwoven textile fabric, all of which may be used to create the overlay 14E.

The polymeric material used to form the bladder element 10, and more particularly a TPU outer layer 24 shown in FIG. 10 can be formed so that the outer surface 40 of the bladder element 10 has a first texture having a first level of roughness. For example, the surface finish of the mold cavity portions 36A, 36B can be controlled to provide a corresponding texture on the outer surface 40. For example, a Class A polish can be obtained, such as by sand blasting all or part of the mold cavity portions 36A, 36B in 0.001 inch increments. Any of the overlays 14A, 14B, 14C, 14D, 14E, 14F, 14G described herein can be formed with an outer surface, at least a portion of which has a second texture having a second level of roughness at least 10 percent greater than the first level of roughness of the bladder element 10. For example, the second texture of the overlay 14E due to the fused regions 90A, 90B, 90C, 90D, 90E can be at least 10 percent greater than the first texture of the bladder element 10. The texture of the overlay 14E can be selected to provide a desired tactile feel.

Figure 18:
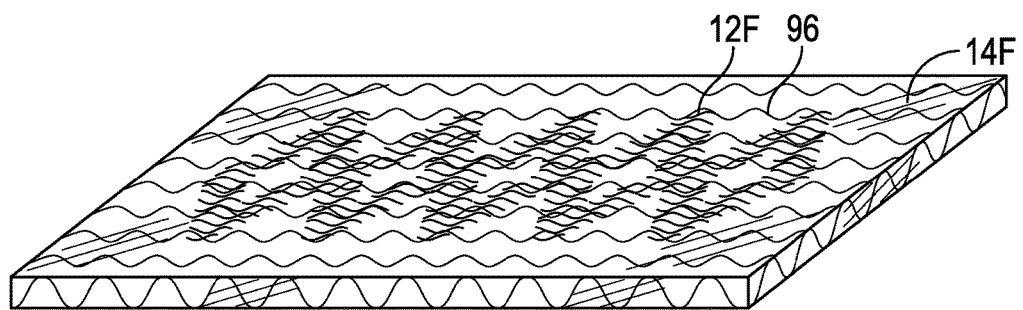
FIG. 18 is a schematic perspective illustration of another alternative embodiment of an overlay for the bladder element of FIG. 1 in accordance with another alternative aspect of the present teachings.
Figure 19:
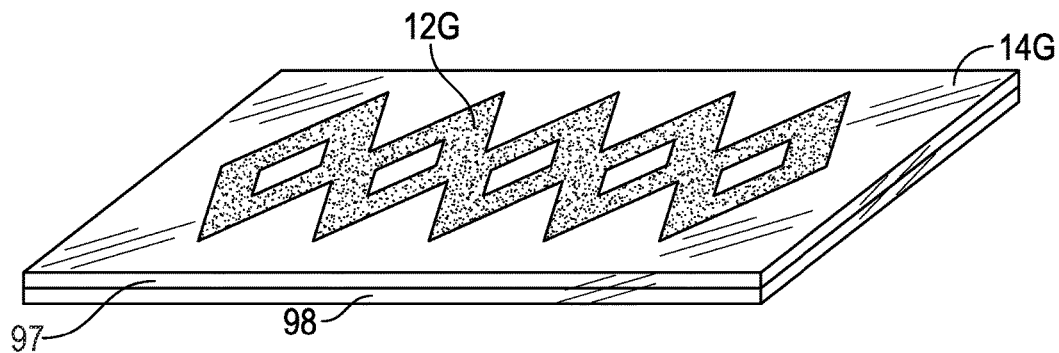
FIG. 19 is a schematic perspective illustration of an alternative embodiment of an overlay for the bladder element of FIG. 1 in accordance with an alternative aspect of the present teachings.

FIG. 18 shows another embodiment of an overlay 14F that can be used in place of any of the overlays 14A, 14B, 14C, 14D, or 14E on the bladder element 10. The overlay 14F comprises a woven fabric having woven threads 96. The colors or types of fabric are chosen and woven in a pattern that creates an image 12F similar to image 12A. FIG. 19 shows another embodiment of an overlay 14G that that can be used in place of any of the overlays 14A, 14B, 14C, 14D, 14E, or 14F on the bladder element 10. The overlay 14G comprises a synthetic leather comprising a polyurethane coating 97 over a polyester backing layer 98. An image 12G similar to image 12A can be applied to either or both of the polyurethane coating 97 and the polyester backing layer 98. If the image is applied to the polyester backing layer 98, then the polyurethane coating 97 may be substantially transparent over the image 12G.

In the embodiments of FIGS. 16, 17, and 18, the images 12E, 12F, and 12G are applied to the overlays 14E, 14F, 14G rather than to the first and second polymeric sheets 20, 22 of the bladder element 10. In other embodiments, the overlays 14E, 14F, 14G can be formed of the materials as described, and may be substantially transparent so that when the overlays 14E, 14F, 14G are aligned with the images and secured to the bladder element 10, the images on the bladder element 10 will be viewable through the overlays 14E, 14F, or 14G.

A method 100 of manufacturing an article, such as the article of footwear 18, begins with step 102, applying an image 12A to polymeric material, such as the first polymeric sheet 20. Additional images 12B, 12C may be applied as described herein. Alternatively, the polymeric material such as the first and second polymeric sheets 20, 22 may be obtained with the images 12A and 12B already applied thereon, in which case step 102 is not performed. Still further, step 102 may be performed after the fluid-filled bladder element is formed from the polymeric sheets 20, 22, i.e., after step.

Figure 20:
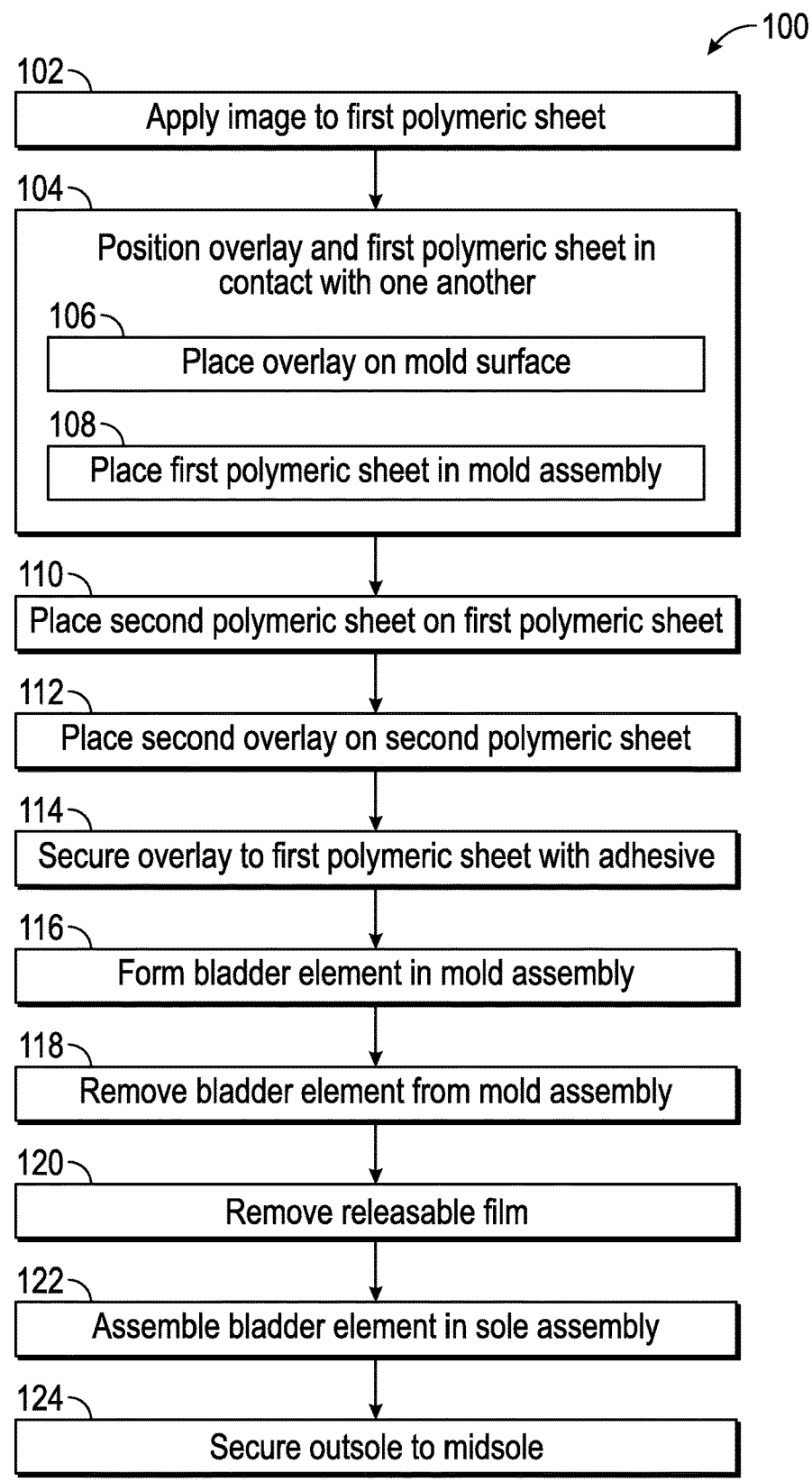
FIG. 20 is a flow diagram illustrating a method of manufacturing an article such as the article of footwear of FIG. 6.

Next, in step 104, an overlay 14A is positioned in contact with the polymeric material used to form the bladder element 10, such as the first polymeric sheet 20. In some embodiments as described herein, the overlay is placed in contact with an outer surface 40 the bladder element 10 after the bladder elements 10 is formed. In the embodiment described in FIG. 20, however, the overlay 14A is placed in the mold assembly 30 in sub-step 106. The overlay 14A is positioned in the mold assembly 30 so that it will be secured to a curved portion 60 of the bladder element 10 when the bladder element 10 is formed. In other words, the overlay 14A is positioned on a corresponding curved portion 55 of the mold surface 34A. If any releasable film 56 is on the overlay 14A, the releasable film 56 is in contact with the mold surface 34A. If the third overlay 14C is included, it is also placed on the mold surface 34A spaced from the first overlay 14A.

The first polymeric sheet 20 is then placed in the mold assembly 30 in sub-step 108 so that a portion of the overlay 14A that is substantially transparent will be aligned with the image 12A on the first polymeric sheet 20 when the bladder element 10 is formed. The second polymeric sheet 22 is then placed on the first polymeric sheet 20 in sub-step 110. If the second overlay 14B is included, it is then placed on the second polymeric sheet 22 in step 112.

Next, in optional step 114, the overlay 14A is secured to the first polymeric sheet 20 with adhesive. The securing in step 114 may be accomplished at least in part by adhesive that may be placed on one or both of the outer surface 40 of the bladder element 10 and the overlay 14 prior to placing the first polymeric sheet 20 on the overlay 14A in sub-step 108. The adhesive forms the adhesive layer 44 described with respect to FIG. 10. Alternatively, no adhesive is used and the overlay 14A is secured to the first polymeric sheet 20 by thermal bonding in step 116.

The method 100 also includes forming the bladder element 10 in the mold assembly 30 in step 116. Forming the bladder element 10 may be by thermoforming, vacuum forming, or both with the overlay 14A and the polymeric sheets 20, 22 in the mold assembly 30 and the mold assembly 30 closed. Additionally, the securing of the overlay 14A to the first polymeric sheet 20 may be accomplished at least in part via the thermoforming of the bladder element 10, as the heat of thermoforming causes heating of the first polymeric sheet 20 and the overlay 14A sufficient to thermally fuse the overlay 14A to the outer surface 40 of the first polymeric sheet 20. If overlays 14B and 14C are included, they may also thermally bond to the second polymeric sheet 22 and the first polymeric sheet 20, respectively.

After any cooling period, the mold assembly 30 is opened, and the bladder element 10 is removed from the mold assembly 30 in step 118. If any releasable film 56 is on any of the overlays 14A, 14B, 14C, the releasable film 56 is removed from the overlays 14A, 14B, 14C in step 120. The bladder element 10 with the overlays 14A, 14B, 14C secured thereto over the image 12A is now complete. If alternative overlays 14D, 14E, 14F, or 14G are used, the method 100 proceeds in the same manner with steps 102-116 as described with respect to overlay 14A.

Optionally, if the same entity carrying out steps 102-120 also assembles the bladder element 10 in an article such as the article of footwear 18, then the method 100 can proceed with steps 122 and 124. In step 122, the fluid-filled bladder element 10 is assembled in the sole assembly 16 of the article of footwear 18 by securing the bladder element 10 to the midsole 70. In various embodiments, securing the bladder element 10 to the midsole 70 can be accomplished with adhesive or with adhesive, such as by forming the midsole 70 around the bladder element 10 in a midsole mold assembly (not shown). In all of these embodiments, the bladder element 10 may be assembled in the article of footwear 18 so that the seam 28 is covered and the image 12A as well as image 12B, if included, are exposed at openings such as openings 72A, 72B in the midsole 70 as described with respect to the embodiment of FIGS. 5 and 6. In other words, the substantially transparent portion of the overlay 14A is aligned with opening 72A so that the image 12A can be viewed from an exterior of the article of footwear 18. Similarly, the substantially transparent portion of the overlay 14B is aligned with the opening 72B so that the image 12B can be viewed at the opening 72B.

Next, in step 124, an outsole can be secured to the midsole 70. If outsole 76A of FIG. 8 is used, the opening 72C is aligned with the image 12C. If outsole 76B of FIG. 9 is used, the substantially transparent portion 80 of the outsole 76B is aligned with the image 12C. As discussed above, the entire outsole 76B may be substantially transparent.

While several modes for carrying out the many aspects of the present teachings have been described in detail, those familiar with the art to which these teachings relate will recognize various alternative aspects for practicing the present teachings that are within the scope of the appended claims. It is intended that all matter contained in the above description or shown in the accompanying drawings shall be interpreted as illustrative only and not as limiting.

The invention claimed is:

1. A method of manufacturing an article comprising:
    forming a fluid-filled bladder element from polymeric material;
    securing an overlay to the polymeric material; wherein at least one portion of the overlay is substantially transparent, and an image on one of the polymeric material and the overlay is aligned with the at least one portion of the overlay that is substantially transparent; and
    assembling the fluid-filled bladder element in the article so that a first portion of the fluid-filled bladder element and the image are exposed to view through the at least one portion of the overlay that is substantially transparent, and a second portion of the fluid-filled bladder element is blocked from view by the article;
    wherein the article is an article of footwear having a sole assembly that includes an outsole;
    wherein at least a portion of the outsole is substantially transparent; and
    wherein said assembling comprises securing the fluid-filled bladder element to the outsole so that the image and the at least one portion of the overlay that is substantially transparent are exposed to view through the portion of the outsole that is substantially transparent.

2. The method of claim 1, wherein the polymeric material comprises a first polymeric sheet and a second polymeric sheet; and
    wherein said forming the fluid-filled bladder element further comprises bonding the first polymeric sheet to the second polymeric sheet to form a peripheral seam that at least partially seals a fluid-filled cavity of the fluid-filled bladder element; and wherein the overlay is spaced apart from the peripheral seam.

3. The method of claim 2, wherein said bonding comprises at least one of compression bonding, thermal bonding, or radio-frequency welding.

4. The method of claim 2, wherein said assembling the fluid-filled bladder element in the article includes covering the peripheral seam with the article so that the peripheral seam is blocked from view by the article.

5. The method of claim 1, wherein:
    the article has an opening; and
    said assembling the fluid-filled bladder element includes aligning the image with the opening so that the image and the at least one portion of the overlay that is substantially transparent are aligned with the opening and exposed to view through the opening.

6. The method of claim 5, wherein:
    the article of footwear has an upper;
    the opening is in the upper; and
    said assembling includes securing the fluid-filled bladder element to the sole assembly.

7. The method of claim 1, wherein:
    said forming the fluid-filled bladder element includes forming the fluid-filled bladder element with a curved portion; and
    said securing the overlay to the polymeric material includes securing the overlay to the curved portion of the fluid-filled bladder element.

8. The method of claim 1, wherein said forming the fluid-filled bladder element includes at least one of thermoforming or vacuum forming.

9. The method of claim 1, wherein said securing the overlay to the polymeric material comprises thermally bonding the overlay and the polymeric material to one another during said forming the fluid-filled bladder element.

10. The method of claim 1, wherein the polymeric material comprises a thermoplastic polymeric material.

11. The method of claim 10, wherein:
the thermoplastic polymeric material is a thermoplastic polyurethane (TPU);
the polymeric material comprises a first polymeric sheet; and
the TPU is present on at least an outer surface of the first polymeric sheet.

12. The method of claim 11, wherein the first polymeric sheet comprises a multi-layer polymeric sheet that is a laminate membrane comprising:
at least a first layer comprising the TPU; and
at least a second layer comprising a gas barrier polymer.

13. The method of claim 12, wherein the gas barrier polymer comprises an ethylene-vinyl alcohol copolymer.

14. The method of claim 10, wherein the overlay comprises a thermoplastic polyurethane (TPU).

15. The method of claim 1, wherein the polymeric material comprises a first polymeric sheet, and further comprising:
applying the image to the first polymeric sheet prior to securing the overlay to the first polymeric sheet.

16. The method of claim 1 wherein the overlay comprises a polyurethane, a polyester, or both.

17. The method of claim 1 wherein the overlay comprises a woven fabric, a nonwoven fabric, a synthetic leather, or any combination thereof.

18. The method of claim 1, wherein the overlay comprises a metal foil.

19. The method of claim 1, wherein the overlay has a first hardness on a Shore A scale and the fluid-filled bladder element has a second hardness on the Shore A scale less than or equal to the first hardness.

20. The method of claim 1, wherein the overlay has a first hardness on a Shore A scale and the fluid-filled bladder element has a second hardness on the Shore A scale greater than or equal to the first hardness.

21. The method of claim 1, wherein the overlay and the polymeric material comprise the same material.

22. The method of claim 1, wherein:
the fluid-filled bladder element has an outer surface with a first texture; and
the overlay has an outer surface at least a portion of which has a second texture different than the first texture.

23. A method of manufacturing an article comprising:
placing an overlay in a mold assembly with polymeric material; wherein said placing the overlay in the mold assembly comprises placing the overlay on a mold surface of the mold assembly;
forming a fluid-filled bladder element from the polymeric material; wherein said forming the fluid-filled bladder element from the polymeric material is with both the overlay and the polymeric material in the mold assembly;
securing the overlay to the polymeric material; wherein at least one portion of the overlay is substantially transparent, and an image on one of the polymeric material and the overlay is aligned with the at least one portion of the overlay that is substantially transparent; and
assembling the fluid-filled bladder element in the article so that a first portion of the fluid-filled bladder element and the image are exposed to view through the at least one portion of the overlay that is substantially transparent, and a second portion of the fluid-filled bladder element is blocked from view by the article.

24. The method of claim 23, wherein the polymeric material comprises a first polymeric sheet; and further comprising:
placing the first polymeric sheet in the mold assembly after placing the overlay in the mold assembly.

25. The method of claim 23, wherein the polymeric material comprises a first polymeric sheet; and further comprising:
prior to said forming the fluid-filled bladder element, attaching a releasable film to the first polymeric sheet over the image;
placing the first polymeric sheet in the mold assembly with the releasable film in contact with the mold surface of the mold assembly; and
removing the releasable film from the first polymeric sheet after the fluid-filled bladder element is formed.

* * * * *